US008493683B2

(12) United States Patent
Lueng et al.

(10) Patent No.: US 8,493,683 B2
(45) Date of Patent: Jul. 23, 2013

(54) MEASURING METHOD OF A MAGNETIC HEAD AND MEASURING APPARATUS THEREOF

(75) Inventors: Chiu ming Lueng, Hong Kong (CN); Mankit Lee, Hong Kong (CN); Cheukwing Leung, Hong Kong (CN); Ju ren Ding, Hong Kong (CN); Rong kwang Ni, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 75 days.

(21) Appl. No.: 13/289,399

(22) Filed: Nov. 4, 2011

(65) Prior Publication Data

US 2013/0114387 A1 May 9, 2013

(51) Int. Cl.
*G11B 21/02* (2006.01)
*G01R 33/12* (2006.01)

(52) U.S. Cl.
USPC ............................................. 360/75; 324/210

(58) Field of Classification Search
USPC ............ 369/13.01, 13.11, 13.12, 13.2, 13.32, 369/53.1, 53.19; 360/31, 59, 75, 313–315, 360/324–324.11; 324/210, 212, 260, 262, 324/207.21
See application file for complete search history.

(56) References Cited

U.S. PATENT DOCUMENTS

| | | | | |
|---|---|---|---|---|
| 5,998,993 | A * | 12/1999 | Inage et al. | 324/210 |
| 2004/0246632 | A1* | 12/2004 | Nishioka et al. | 360/324.11 |
| 2007/0188167 | A1* | 8/2007 | Sasaki et al. | 324/210 |
| 2007/0273370 | A1* | 11/2007 | Yasunaga et al. | 324/210 |
| 2008/0049351 | A1* | 2/2008 | Yamanaka et al. | 360/59 |
| 2008/0239582 | A1* | 10/2008 | Kanaya et al. | 360/313 |
| 2008/0239584 | A1* | 10/2008 | Anagawa et al. | 360/319 |
| 2009/0027809 | A1* | 1/2009 | Kamijima et al. | 360/319 |
| 2009/0195903 | A1* | 8/2009 | Yoshinami | 360/31 |
| 2009/0219018 | A1* | 9/2009 | Shimazawa | 324/210 |
| 2012/0274317 | A1* | 11/2012 | Lueng et al. | 324/210 |
| 2012/0275047 | A1* | 11/2012 | Lui et al. | 360/31 |

* cited by examiner

*Primary Examiner* — Thang Tran
(74) *Attorney, Agent, or Firm* — Nixon & Vanderhye PC

(57) ABSTRACT

Measuring method of a magnetic head includes (a) placing the magnetic head at normal position, defining a first direction parallel to an air bearing surface and two shielding layers of the magnetic head, and defining a second direction perpendicular to the first direction; (b) tilting the magnetic head at an angle to the second direction, applying a plurality of first magnetic fields with different intensities in the first direction, and measuring out a first output parameter curve; (c) repeating the step (b) with different angles and measuring out a plurality of first output parameter curves; (d) calculating a plurality of pinned direction tilt ratios that a pinned direction of a pinned layer of the magnetic head tilts towards the second direction according to the parameter curves; and (e) calculating a pinned direction tilt angle that the pinned direction tilts towards the second direction according to the pinned direction tilting ratios.

25 Claims, 18 Drawing Sheets

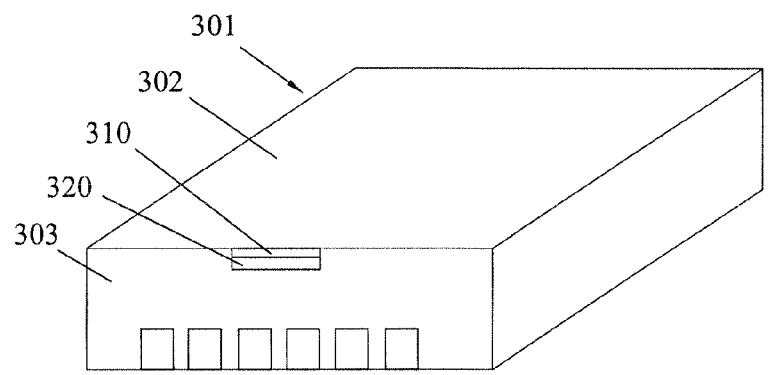
Fig. 3
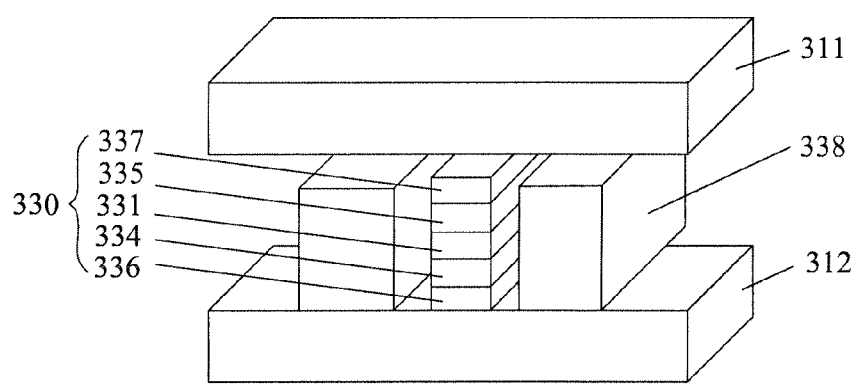
Fig. 4
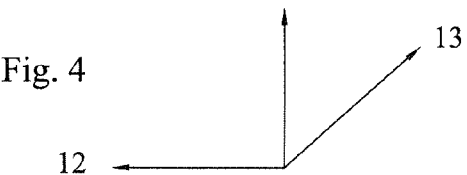

MEASURING METHOD OF A MAGNETIC HEAD AND MEASURING APPARATUS THEREOF

FIELD OF THE INVENTION

The present invention relates to a measuring method of a magnetic head and a measuring apparatus thereof, more particularly to a measuring method of pinned direction tilt angle of a pinned layer in the magnetic head, and a measuring method of magnetization direction tilting angle of a free layer in the magnetic head and the apparatus thereof.

BACKGROUND OF THE INVENTION

Hard disk drive incorporating rotating magnetic disks is commonly used for storing data in the magnetic media formed on the disk surfaces, and a movable head are generally used to read data from and write date into tracks on the disk surfaces.

A conventional magnetic head for a slider typically includes a read portion for reading data from the disk, and a write portion for writing data into the disk. Presently, magnetoresistive (MR) sensor is used as a kind of popular read sensor because of its better capability to read data from disk surface at a greater track and linear densities than traditional film inductive slider. Thus, the read portion of the magnetic head is generally formed by a MR read head, such as Current Perpendicular to Plane (CPP), Current In Plane (CIP), tunnel magnetoresistive (TMR), giant magnetoresistive (GMR), or anisotropic magnetoresistive (AMR) read heads.

For example, FIG. 1 shows a conventional magnetic head 200 including a CPP-TMR read head 210 for reading data from the disk and a write head 220 for writing data into the disk. The magnetic head 200 includes a substrate body 201, an air bearing surface (ABS) 202 and a bottom surface (not shown) opposite to the ABS 202, a trailing edge 203 and a leading edge (not shown) opposite each other. The ABS 202 is processed so as to an appropriate flying height. And the read head 210 and the write head 220 are provided on the trailing edge 203.

As shown in FIG. 2a, the read head 210 includes a substrate layer 214, two shielding layers 211, 212, and a MR element (not labeled) sandwiched therebetween. As illustrated, the MR element is a standard and normal MR element and includes a pinning layer (or an antiferromagnetic (AFM) layer) 236, two synthetic pinned layers 231, 234, a tunnel barrier layer 235, a free layer 237, and a cap layer 232. The read head 210 further includes a pair of hard magnet layers 238 placed at two sides of the MR element on the buffer layer 216 for longitudinally biasing the magnetization of the free layer 237, and an insulating layer 239 for separating and isolating the hard magnet layer 238 from the free layer 237 and the other layers of the MR element.

Referring to FIG. 2a again, concretely, the pair of hard magnet layers 238 has a magnetic direction, indicated by arrow 258, the magnetic direction 258 orients generally parallel to the ABS 202 (shown in FIG. 1). The pinned layer 231 has a pinned direction 254 for preventing from rotation in the presence of applied magnetic fields in the desired range of interest. Desired by manufacturer and the customers, the pinned direction 254 of the pinned layer 231 should be oriented perpendicular to the ABS 202 to achieve the best function, which is called normal pinned direction or standard pinned direction. The free layer 237 contains a ferromagnetic substance and has a magnetization direction 256 that changes in responds to an external magnetic field. Also desired, it's the best that the magnetization direction 256 of the free layer 237 orients parallel to the ABS 15 in the absence of an applied external magnetic field, under this case the magnetization direction is called normal magnetization direction or standard magnetization direction. In other words, ideally, the normal pinned direction 254 of the pinned layer 231 is perpendicular to the normal magnetization direction 256 of the free layer 237.

However, in the practical application of a magnetic head product, the actual pinned direction 254' of the pinned layer 231 always has an offset to the normal pinned direction 254 for certain factors, and the actual magnetization 256' of the free layer 237 also has an offset to the normal magnetization direction 256, as shown in FIG. 2b, for example. As illustrated, the actual pinned direction 254' tilts from the normal pinned direction 254 at an angle of θ1, and the actual magnetization direction 256' tilts from the actual pinned direction 254' at an angle of θ2. By all appearances, the above-mentioned tilt angles are not desired since it will bring unstable performance. However, there is still no solution for the manufacturers to accurately measure out the actual tilt angles θ1, θ2 yet. Thus it's hard for the technical persons to test the instability of the pinned layer and free layer with being ignorant of their tilt angles. Accordingly, a remedy and an improvement for the drawbacks resulted by the tilt angles could not be implemented. Worse still, the magnetic head may be abandoned due to the severe tilt angle.

Hence, it is desired to provide a measuring method of a magnetic head to measure out the above-mentioned tilt angles, so as to overcome the drawbacks mentioned-above.

SUMMARY OF THE INVENTION

One objective of the present invention is to provide a measuring method of a magnetic head, which can calculate the pinned direction tilt angle of the pinned layer that the actual pinned direction tilts towards the normal pinned direction; moreover, the measuring method is easy to operate, and the measuring result is accurate.

Accordingly, another objective of the present invention is to provide a measuring method of a magnetic head, which can calculate the actual pinned direction tilt angle of the pinned layer that the actual pinned direction tilts towards the normal pinned direction, and the magnetization direction tilt angle of the free layer that the actual magnetization direction tilts from the actual pinned direction.

Accordingly, yet an objective of the present invention is to provide a measuring apparatus of a magnetic head, which can calculate the pinned direction tilt angle of the pinned layer that the actual pinned direction tilts towards the normal pinned direction; moreover, the measuring method is easy to operate, and the measuring result is accurate.

To achieve the above objectives, a measuring method of a magnetic head of the present invention, includes steps of:

(a) placing the magnetic head at normal position, defining a first direction parallel to an ABS and two shielding layers of the magnetic head, and defining a second direction perpendicular to the ABS;

(b) tilting the magnetic head at an angle to the second direction, applying a plurality of first magnetic fields with different intensities in the first direction to the magnetic head, and measuring out a first output parameter curve;

(c) repeating the step (b) with different angles and measuring out a plurality of first output parameter curves;

(d) calculating a plurality of pinned direction tilt ratios that a pinned direction of a pinned layer of the magnetic head tilts towards the second direction according to the first output parameter curves; and (e) calculating a pinned direction tilt angle that the pinned direction tilts towards the second direction according to the pinned direction tilting ratios.

As a preferred embodiment, applying a plurality of first magnetic fields with different intensities in the first direction to the magnetic head in the step (b) further comprises sub-steps of:

(b1) gradually applying the first magnetic field from 0 Oe to +15 kOe, thereby obtaining a first curve portion of the first output parameter curve;

(b2) gradually applying the first magnetic field from +15 kOe to 0 Oe, thereby obtaining a second curve portion of the first output parameter curve;

(b3) gradually applying the first magnetic field from 0 Oe to −15 kOe, thereby obtaining a third curve portion of the first output parameter curve; and (b4) gradually applying the first magnetic field from −15 kOe to 0 Oe, thereby obtaining a fourth curve portion of the first output parameter curve.

Preferably, the step (d) further includes detecting a pair of output amplitudes at symmetrical coordinates on the first output parameter curve, and detecting the minimal output amplitude on the first output parameter curve so as to calculate the pinned direction tilting ratio.

Preferably, the step (d) further includes detecting the pair of output amplitudes on the second curve portion and the fourth curve portion of the first output parameter curve at symmetrical coordinates.

Preferably, the step (d) further includes detecting the pair of output amplitudes on the first output parameter curve under the first magnetic field with intensities of −1.5 kOe and +1.5 kOe respectively.

Preferably, the step (d) further includes detecting the pair of output amplitudes on the first output parameter curve under the magnetic field with intensities of −1 kOe and +1 kOe respectively.

Preferably, the angle in the steps (b) and (c) has a range of −80°~+90°.

As another embodiment, after the step (e), the method further includes steps of:

(f) titling the magnetic head to make the pinned direction parallel to the first direction, applying a plurality of second magnetic fields with different intensities in the first direction to the magnetic head, and measuring out a second output parameter curve;

(g) detecting several maximum output amplitudes on the second output parameter curve so as to calculate a magnetization direction tilt ratio of a magnetization direction of a free layer of the magnetic head titling towards the pinned direction; and (h) calculating a magnetization direction tilt angle that the magnetization direction tilts towards the pinned direction according to the magnetization direction tilt ratio.

Preferably, applying a plurality of second magnetic fields with different intensities in the first direction to the magnetic head in the step (f) further includes sub-steps of:

(f1) gradually applying the second magnetic field from 0 Oe to +15 kOe, thereby obtaining a first curve portion of the second output parameter curve;

(f2) gradually applying the second magnetic field from +15 kOe to 0 Oe, thereby obtaining a second curve portion of the second output parameter curve;

(f3) gradually applying the second magnetic field from 0 Oe to −15 kOe, thereby obtaining a third curve portion of the second output parameter curve; and (f4) gradually applying the second magnetic field from −15 kOe to 0 Oe, thereby obtaining a fourth curve portion of the second output parameter curve.

Preferably, the step (g) further includes detecting a first maximum output amplitude on the first and second curve portions of the second output parameter curve, and detecting a second maximum output amplitude on the third and fourth curve portions of the second output parameter curve.

Accordingly, a measuring apparatus of a magnetic head of the present invention includes an adjustment device for tilting the magnetic head at an angle to a second direction that is perpendicular to an ABS of the magnetic head; a magnetic field applying device for applying a plurality of first magnetic fields with different intensities in a first direction to the magnetic head, and the first direction parallel to the ABS and two shielding layers of the magnetic head; a measuring device for measuring out first output parameter curves with the first magnetic fields applying; and an calculation device for calculating pinned direction tilt ratios that a pinned direction of a pinned layer of the magnetic head tilts towards the second direction according to the first output parameter curves, and calculating a pinned direction tilt angle that the pinned direction tilts towards the second direction according to the pinned direction tilting ratios.

In comparison with the prior art, the present invention can calculate the pinned direction tilt angle of the pinned layer that the actual pinned direction tilts towards the second direction (the normal pinned direction), and calculate the magnetization direction tilt angle of the free layer that the actual magnetization direction tilts towards the actual pinned direction. Thus the manufacturers can understand the performance of the magnetic head according to the tilt angles, and try to improve the bad performance before the product into the market. Therefore the measuring method of the present invention is quite desired by the manufacturers.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is a schematic diagram that shows the actual pinned direction of a pinned layer of the read head and the actual magnetization direction of a free layer of the read head shown in FIG. 2a;

FIG. 3 is a perspective view of a magnetic head according to the present invention;

FIG. 4 is a perspective view of a read head of the magnetic head shown in FIG. 3;

DETAILED DESCRIPTION OF ILLUSTRATED EMBODIMENTS

Figure 1:
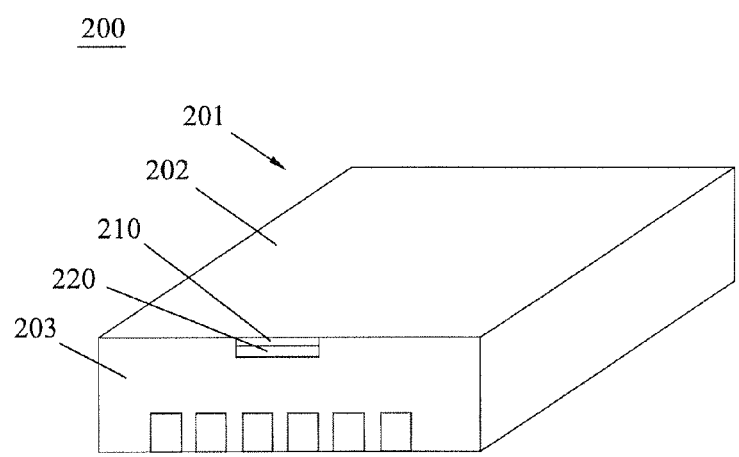
FIG. 1 is a perspective view of a conventional magnetic head.
Figure 2A:
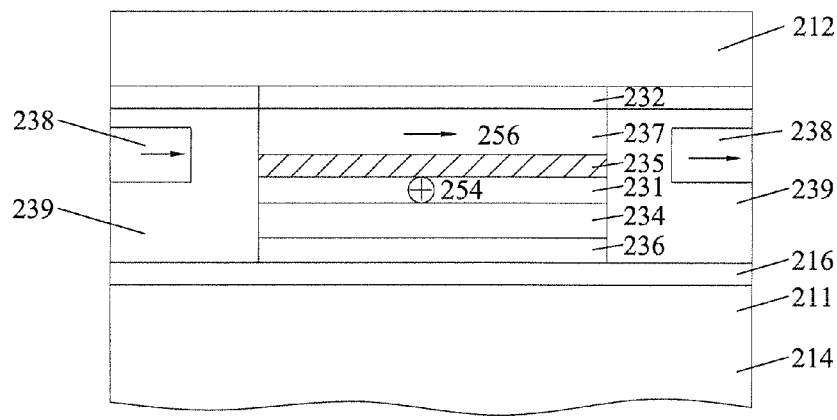
FIG. 2a is a cross section view of a read head of the magnetic head shown in FIG. 1.
Figure 2B:
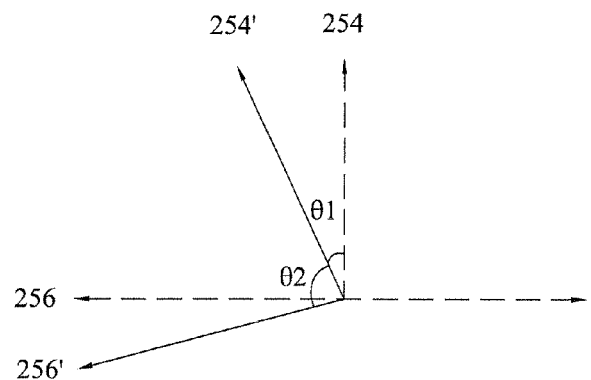

Various preferred embodiments of the invention will now be described with reference to the figures, wherein like reference numerals designate similar parts throughout the various views. As indicated above, the invention is directed to a measuring method of a magnetic head, which can calculate the actual pining direction tilt angle of the pinned direction of the pinned layer tilting towards a normal direction; moreover, the measuring method is easy to operate, and the measuring result is accurate.

In this invention, the present description only concentrates on the embodiment of the CPP-TMR read head. But the invention is not limited to this type of read head, any MR read head including pinned layer and free layer can be tested by the measuring method of the present invention by the persons ordinarily skilled in the art.

Referring to FIG. 3, the magnetic head 300 of the invention includes a substrate body 301, an ABS 302 and a bottom surface (not shown) opposite to the ABS 302, a trailing edge 303 and a trailing edge (not shown) opposite each other. A read head 310 and a write head 320 is embedded in the trailing edge 303, and As shown in FIG. 4, the read head 310 includes two shielding layer 311, 312 and a MR element 330 sandwiched therebetween and having a pinning (or an AFM) layer 336, and two synthetic pinned layers 331 and 334, a tunnel barrier layer 335 and a free layer 337. A pair of hard magnet layers 338 is placed at two sides of the MR element 330.

The actual pinned direction of the pinned layer 331 and the actua magnetization direction of the free layer 337 will be measured by the following description. For the best illustration, only the pinned direction and the magnetization direction will be shown in the following description.

Figure 5:
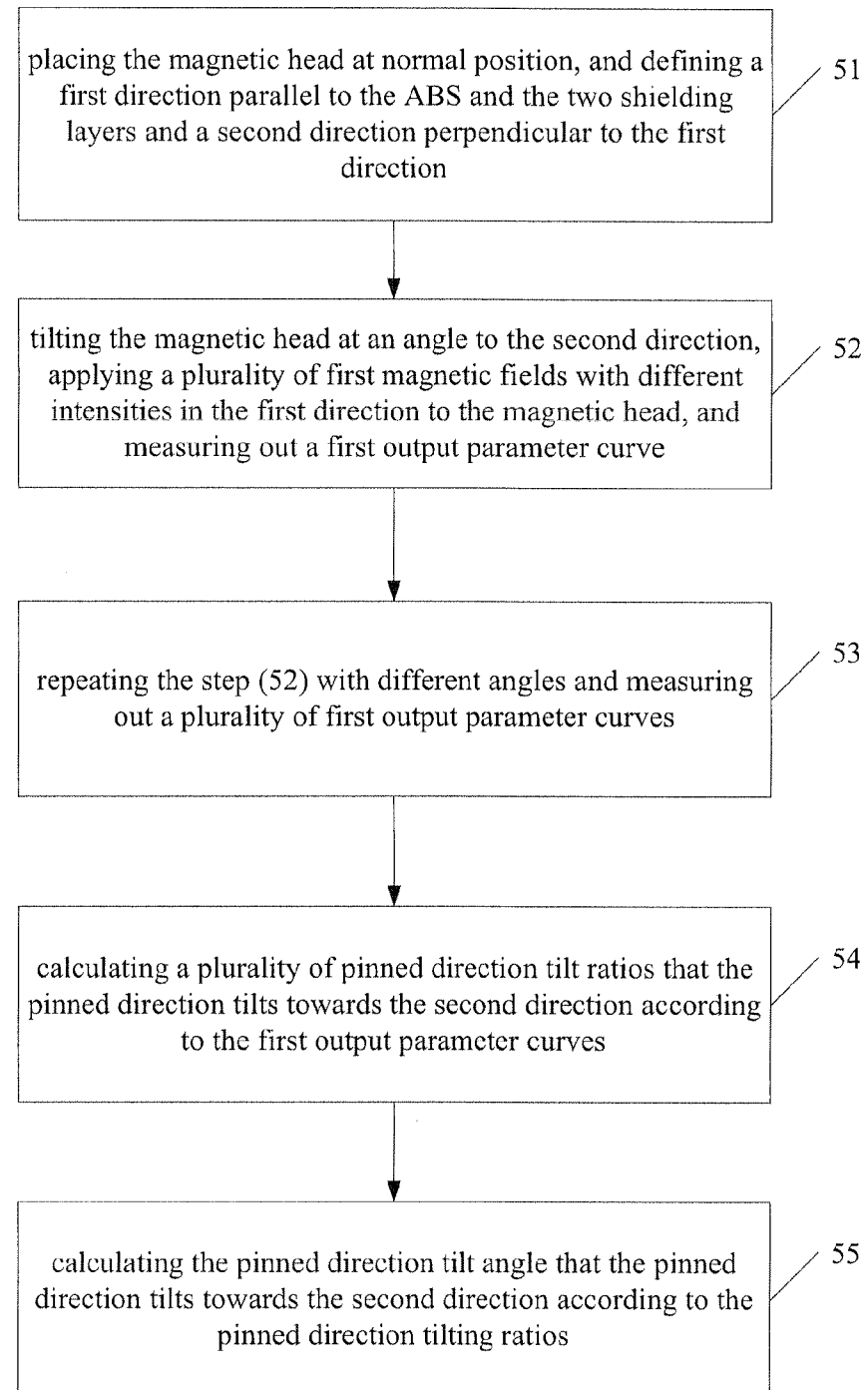
FIG. 5 is a flowchart of measuring method of a magnetic head according to one embodiment of the present invention.

FIG. 5 is a flowchart of measuring method of a magnetic head according to one embodiment of the present invention, which includes:

Step (51) placing the magnetic head at normal position, and defining a first direction parallel to the ABS and the two shielding layers and a second direction perpendicular to ABS;

Step (52) tilting the magnetic head at an angle to the second direction, applying a plurality of first magnetic fields with different intensities in the first direction to the magnetic head, and measuring out a first output parameter curve;

step (53) repeating the step (52) with different angles and measuring out a plurality of first output parameter curves;

step (54) calculating a plurality of pinned direction tilt ratios that the pinned direction tilts towards the second direction according to the first output parameter curves; and step (55) calculating the pinned direction tilt angle that the pinned direction tilts towards the second direction according to the pinned direction tilting ratios.

By combining with FIGS. 3-5, the normal position of the magnetic head 300 in the present invention is the position that ABS 302 of the magnetic head 300 is parallel to the horizontal, that is, the substrate body 301 is parallel to the horizontal and has no tilting towards the horizontal. As shown in FIGS. 3-4, the first direction 12 is parallel to the ABS 302 and the two shielding layers 311, 312, and the second direction 13 is perpendicular to the first direction 12 and ABS 302, the second direction 13 corresponds to the normal pinned direction.

Specifically, the angle in the steps (52) and (53) has a range of −80°~+90°. In the present invention, eighteen measuring times for one magnetic head sample is carried out within the above angle range so as to ensure the measuring precision, for example at angles −80°, −70°, . . . , −20°, −10°, 0, +10°, +20°, . . . , +70°, +80°, +90° respectively. The measuring times are not limited in the present invention of course.

Preferably, the intensities of the first magnetic field applied at every measuring time has a range of −15 kOe~15 kOe. It should be noticed that, the magnetic field with positive number has an opposite direction to the magnetic field with negative number, which is known to persons ordinarily skilled in the art. Concretely, the first output parameter curve in the step (52) is measured out by applying the different first magnetic fields for a cycle with four times. More concretely, the substeps include gradually applying the first magnetic field from 0 Oe to 15 kOe, thereby obtaining a first curve portion of the first output parameter curve; gradually applying the first magnetic field from 15 kOe to 0 Oe, thereby obtaining a second curve portion of the first output parameter curve; gradually applying the first magnetic field from 0 Oe to −15 kOe, thereby obtaining a third curve portion of the first output parameter curve; and gradually applying the first magnetic field from −15 kOe to 0 Oe, thereby obtaining a fourth curve portion of the first output parameter curve.

As an essential of the present invention, the pinned direction tilt ratios in the step (54) is calculated by detecting a pair of output amplitudes at symmetrical coordinates, and a minimal output amplitude on the first output parameter curve and computing by a formula. It's preferable to select the pair of output amplitudes on the first output parameter curve under the magnetic field with intensities of −1.5 kOe and 1.5 kOe respectively or −1.0 kOe and 1.0 kOe respectively. More preferably, the pair of output amplitudes is selected on the second curve portion and the fourth curve portion of the first output parameter curve at symmetrical coordinates.

Within the contemplation of the present invention, the magnetization direction tilt angle of the free layer that tilts towards the pinned direction can be measured out basing on the pinned direction tilt angle measured out.

Figure 6:
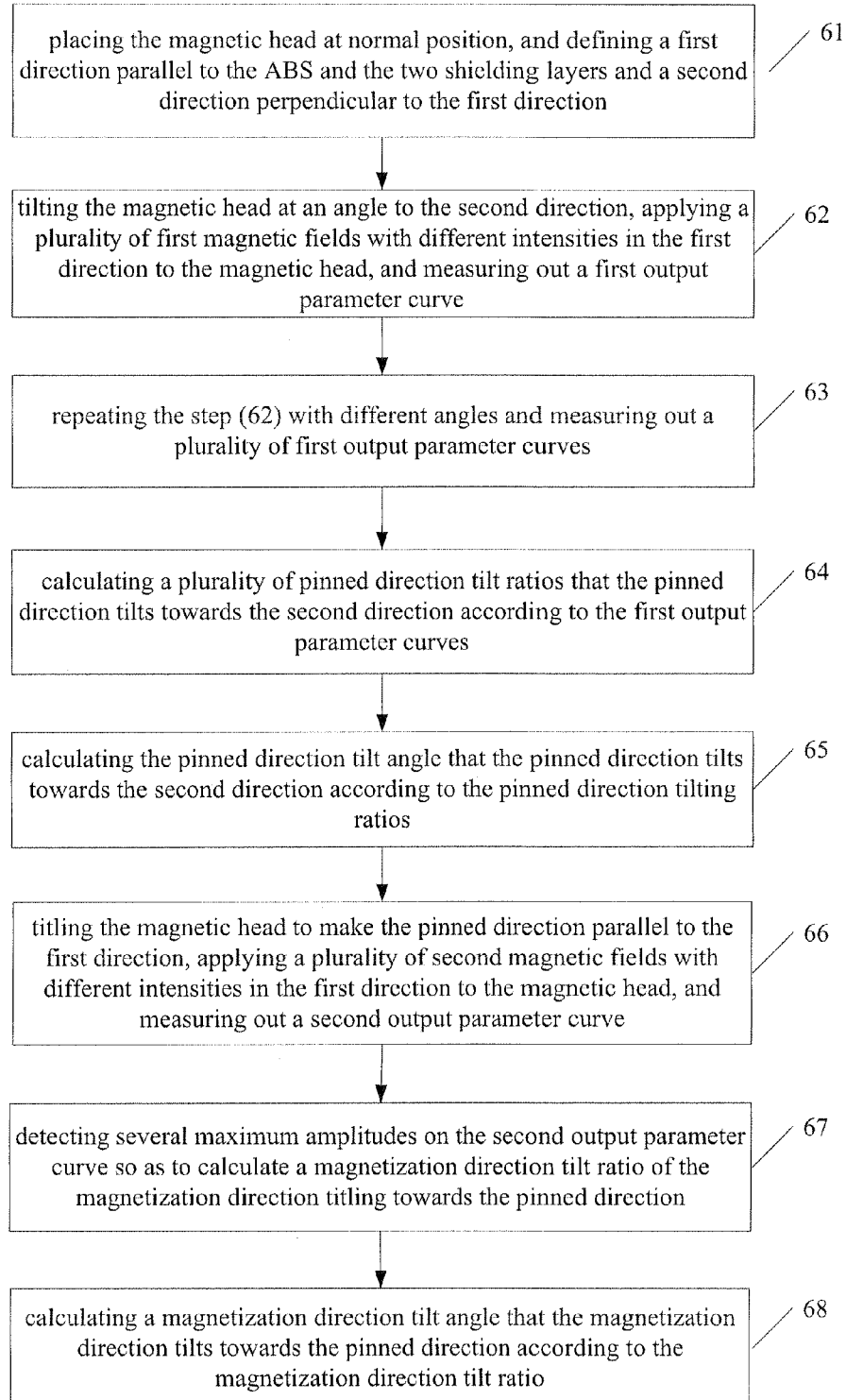
FIG. 6 is a flowchart of measuring method of a magnetic head according to another preferable embodiment of the present invention.

FIG. 6 is a flowchart of measuring method of a magnetic head according to another preferable embodiment of the present invention, which includes:

Step (61) placing the magnetic head at normal position, and defining a first direction parallel to the ABS and the two shielding layers and a second direction perpendicular to the first direction;

Step (62) tilting the magnetic head at an angle to the second direction, applying a plurality of first magnetic fields with different intensities in the first direction to the magnetic head, and measuring out a first output parameter curve;

step (63) repeating the step (62) with different angles and measuring out a plurality of first output parameter curves;

step (64) calculating a plurality of pinned direction tilt ratios that the pinned direction tilts towards the second direction according to the first output parameter curves;

step (65) calculating the pinned direction tilt angle that the pinned direction tilts towards the second direction according to the pinned direction tilting ratios;

step (66) titling the magnetic head to make the pinned direction parallel to the first direction, applying a plurality of second magnetic fields with different intensities in the first direction to the magnetic head, and measuring out a second output parameter curve; concretely, the pinned direction can be tilted to the same to the first direction, or opposite to the first direction.

step (67) detecting several maximum amplitudes on the second output parameter curve so as to calculate a magnetization direction tilt ratio of the magnetization direction titling towards the pinned direction; and step (68) calculating a magnetization direction tilt angle that the magnetization direction tilts towards the pinned direction according to the magnetization direction tilt ratio.

Similarly to the first embodiment, the range of the intensities of the second magnetic field is −15 kOe~15 kOe as well. Concretely, the second output parameter curve in the step (66) is measured out by applying the different second magnetic fields for a cycle with four times. More concretely, the sub-steps include gradually applying the second magnetic field from 0 Oe to 15 kOe, thereby obtaining a first curve portion of the second output parameter curve; gradually applying the second magnetic field from 15 kOe to 0 Oe, thereby obtaining a second curve portion of the second output parameter curve; gradually applying the second magnetic field from 0 Oe to −15 kOe, thereby obtaining a third curve portion of the second output parameter curve; and gradually applying the second magnetic field from −15 kOe to 0 Oe, thereby obtaining a fourth curve portion of the second output parameter curve.

Specifically, the first maximum output amplitude is detected on the first and the second curve portions, and the second maximum output amplitude is detected on the third and fourth curve portions, and the magnetization direction tilt ratio of the magnetization direction tilting towards the pinned direction can be calculated according to the two output amplitudes, and then the magnetization direction tilt angle can be calculated according to the magnetization direction tilt ratio which is known to person ordinarily skilled in the art.

Now the detailed invention concepts will be explained specifically by combining with several measurement experimentation examples. In the following examples, the output parameter of the first and second output parameter curves is indicated by output voltage; it also can be indicated by output resistance, of course.

FIGS. 7a-7i and FIGS. 8a-8i show measuring graphs for a first magnetic head sample according to a first embodiment. As mentioned above, the magnetic head sample is measured by eighteen times under tilt angles of −80°, −70°, −20°, −10°, 0, +10°, +20°, . . . , +70°, +80°, +90° respectively. Every first output parameter curve is obtained by applying the first magnetic field according to four sub-steps explained above, and the first output parameter curve includes first, second, third and fourth curve portions (not labeled).

Figure 7A:
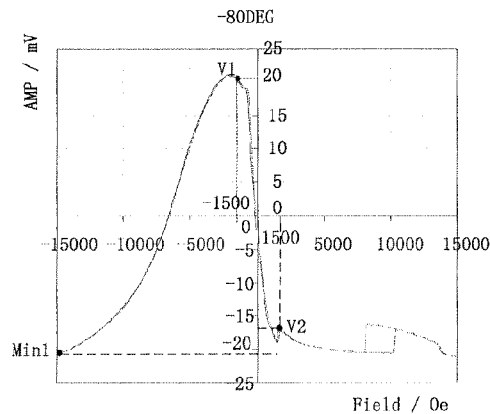
FIGS. 7a-7i and FIGS. 8a-8i show measuring graphs for a first magnetic head sample according to a first embodiment.
Figure 7D:
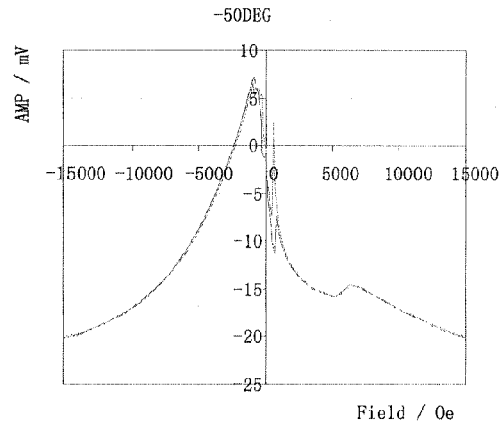
Figure 7B:
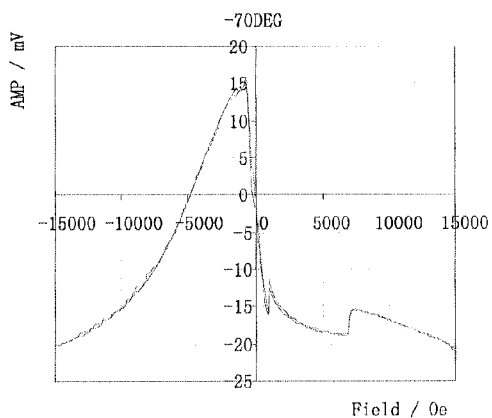
Figure 7E:
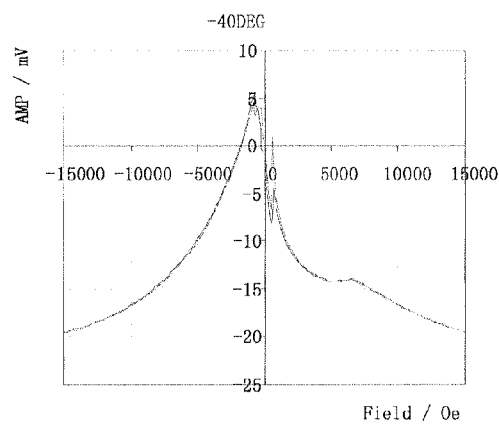
Figure 7C:
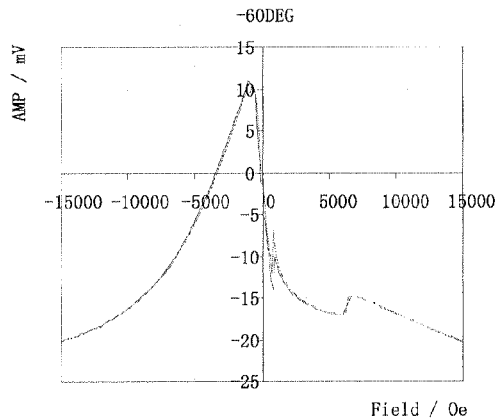
Figure 7F:
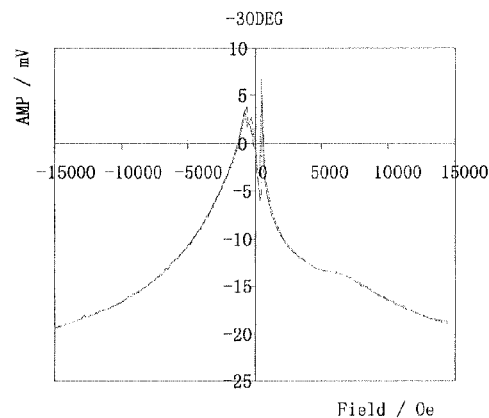
Figures 7G, 8A:
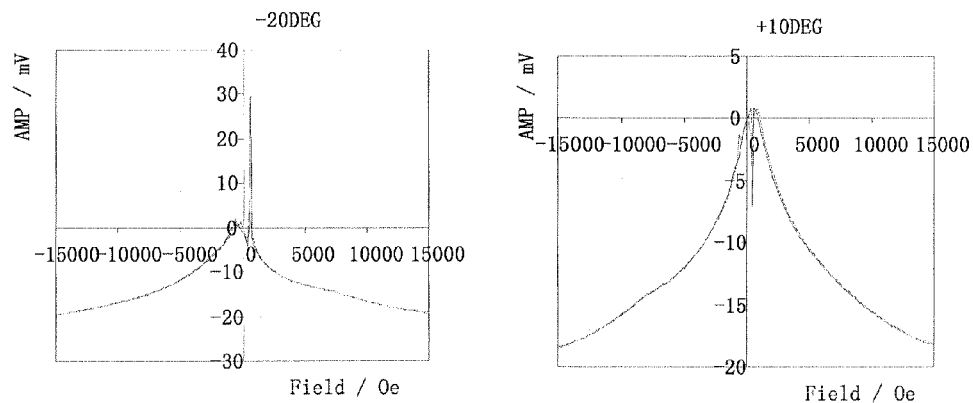
Figures 7H, 8B:
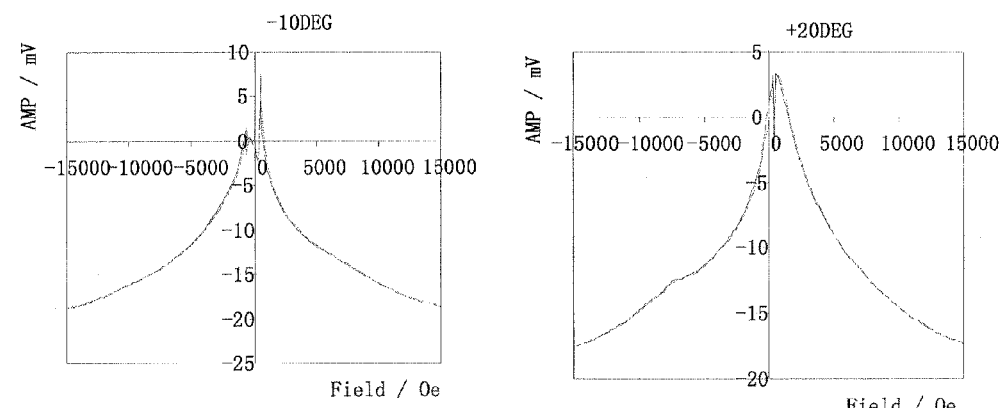
Figures 7I, 8C:
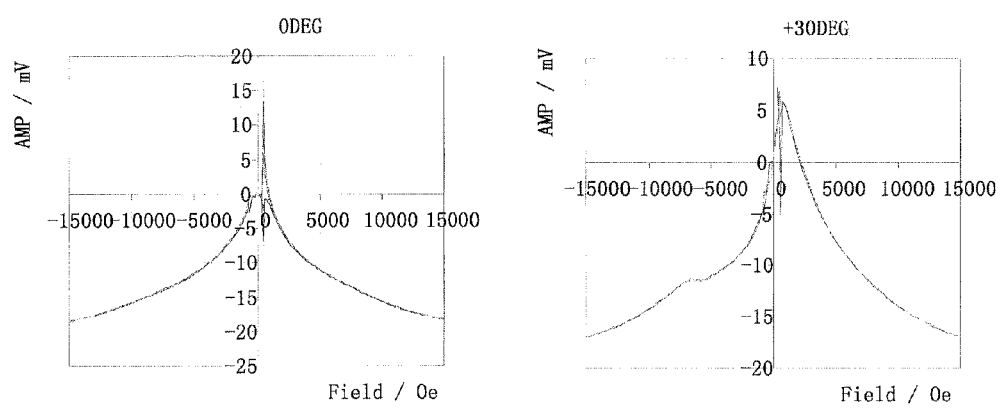
Figure 8D:
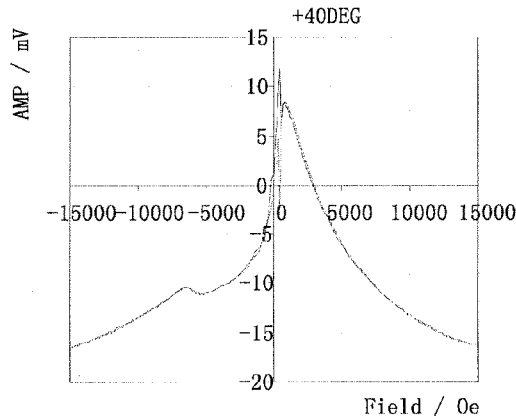
Figure 8G:
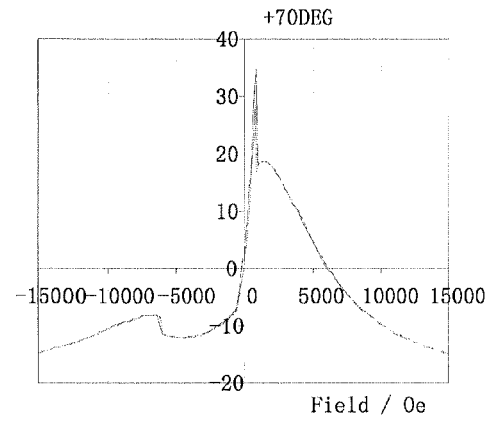
Figure 8E:
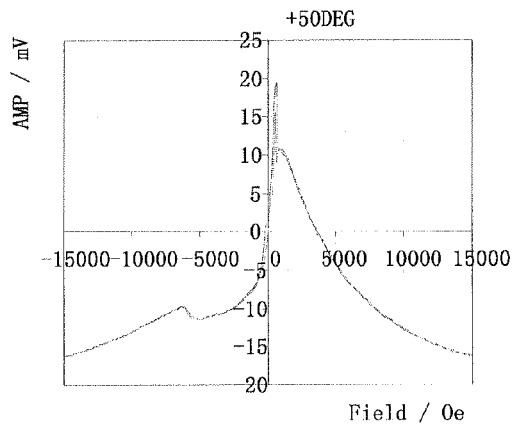
Figure 8H:
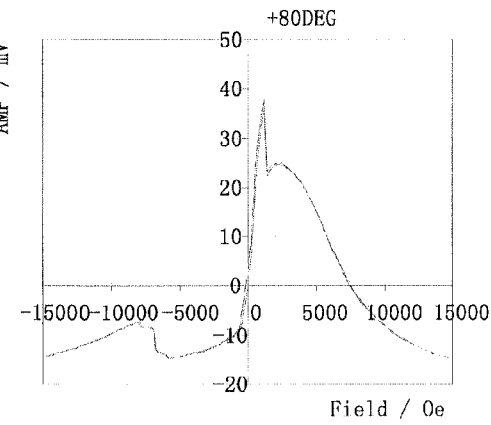
Figure 8F:
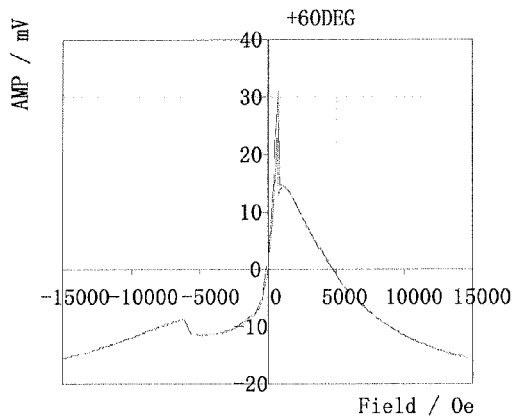
Figure 8I:
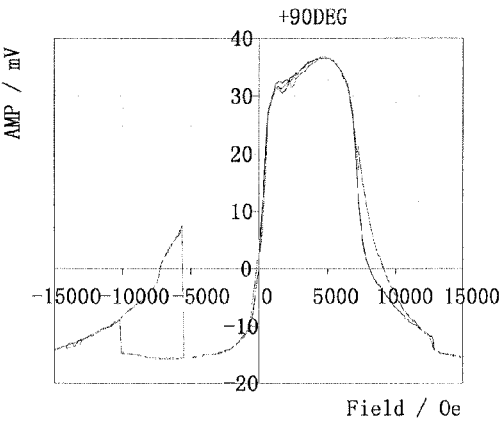

And then, a plurality of pinned direction tilt ratios is calculated according to these curves. As shown in FIG. 7a for example, the minimal output amplitude on the first output parameter curve is detected and labeled by Min1, and the two output amplitudes are detected under the Y-coordinate is −1.5 kOe and 1.5 kOe and labeled by V1, V2, and the pinned direction tilt ratio can be calculated by the below equation:

$$T = \frac{(V1 - \text{Min}1) - (V2 - \text{Min}1)}{(V1 + \text{Min}1) + (V2 + \text{Min}1)};$$

Figure 9:
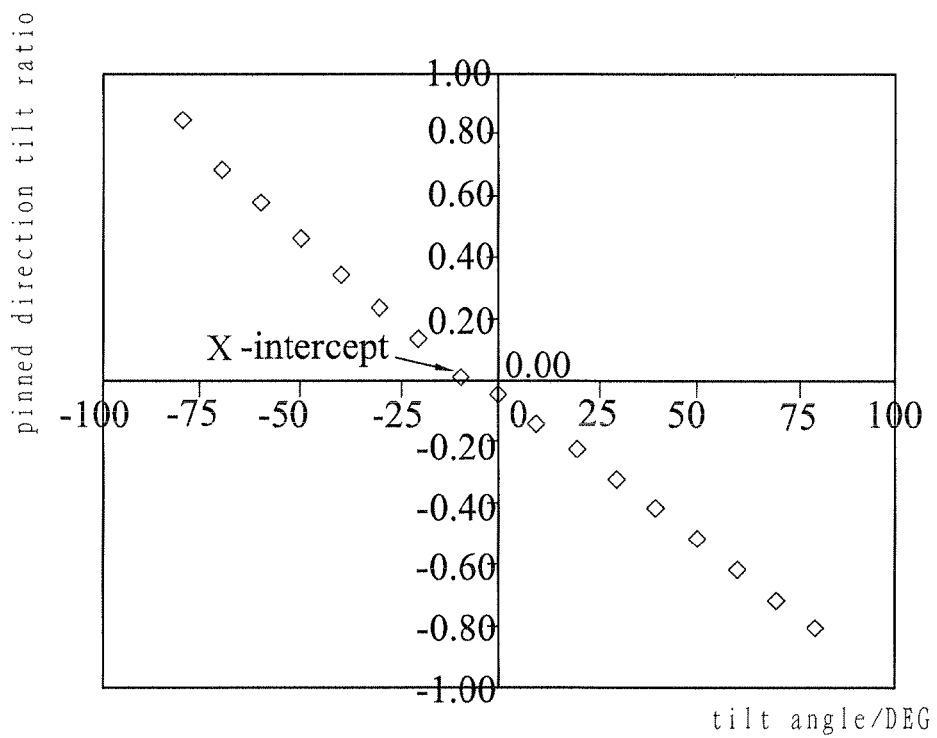
FIG. 9 is a graph that all the pinned direction tilt ratios are plotted thereon according to the first embodiment.

Similarly, all the pined direction tilt ratios of the graphs are calculated by the above method which are not shown in every graph. FIG. 9 is a graph that all the pined direction tilt ratios are plotted thereon.

Figure 9A:
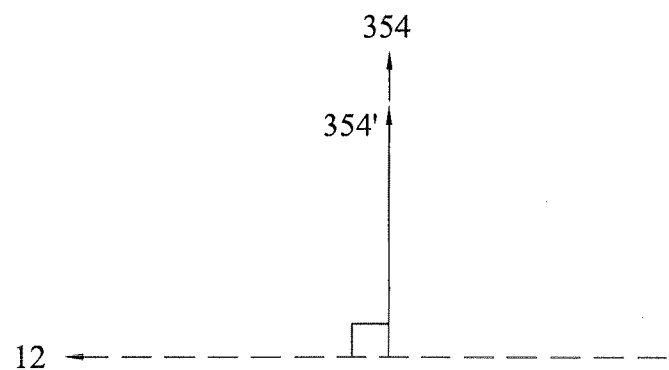
FIG. 9a shows a first tilting status of the pinned direction tilt ratio.
Figure 9B:
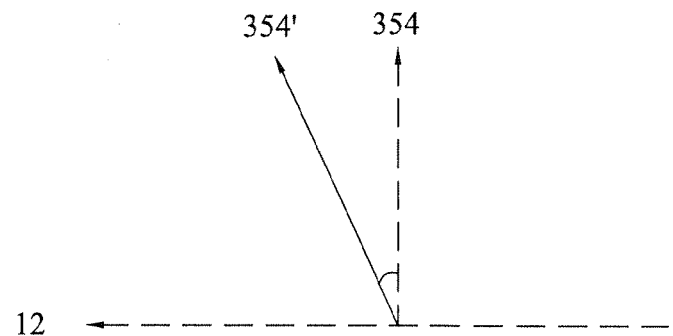
FIG. 9b shows a second tilting status of the pinned direction tilt ratio.
Figure 9C:
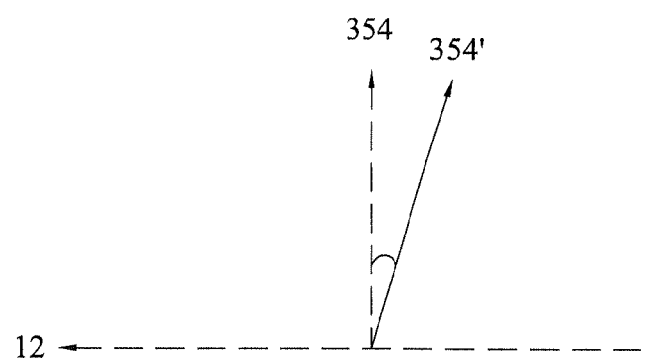
FIG. 9c shows a third tilting status of the pinned direction tilt ratio.

Within the contemplation of the present invention, if the pinned direction tilt ratio is equal to Zero, the actual pinned direction 354' has no offset to the normal pinned direction 354, namely the actual pinned direction 354' is perpendicular to the first direction 12 shown in FIG. 9a and FIG. 4; if the pinned direction tilt ratio is smaller than Zero, the actual pinned direction 354' tilts towards one side of the normal pinned direction 354 at a negative angle as shown in FIG. 9b and FIG. 4; if the pinned direction tilt ratio is larger than Zero, the actual pinned direction 354' tilts towards another side of the normal pinned direction 354 at a positive angle as shown in FIG. 9c and FIG. 4, which is easy to be understood by persons ordinarily skilled in the art.

Figure 9D:
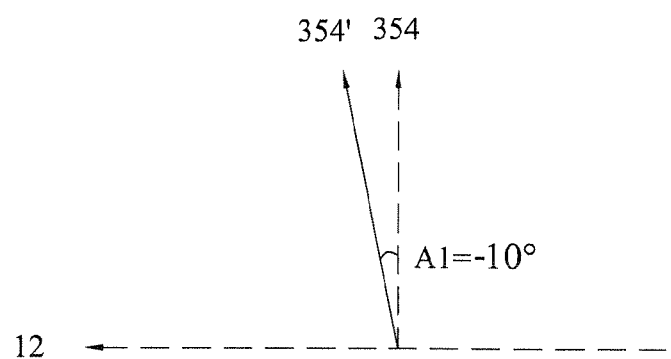
FIG. 9d shows an actual tilting status of the pinned direction tilt ratio according to the first embodiment.

Basing on the above concept, the actual pinned direction tilt angle can be calculated in the curve shown in FIG. 9. The X-intercept on the X-axis of the curve will be estimated, which is the actual pinned direction tilt angle. It can be seen that, the actual pinned direction tilt angle A1 of the present embodiment is equal to −10°, which the tilting status of the actual pinned direction 354' is shown in FIG. 9d.

Figure 10:
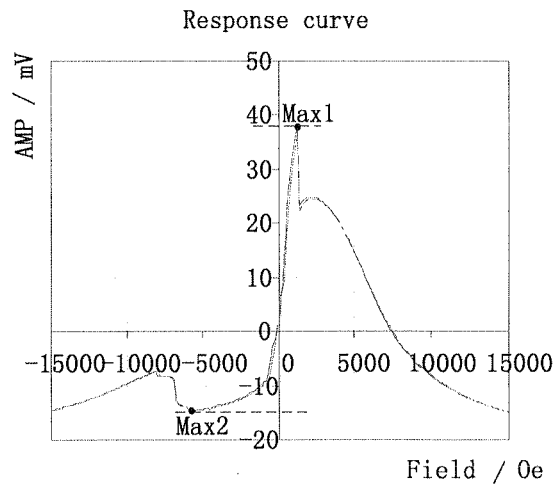
FIG. 10 shows a response curve of the magnetic head that the pinned direction is tilted parallel to the first direction according to the first embodiment.

Now the actual magnetization direction tilt angle of the free layer will be measured based on the actual pinned direction tilt angle A1=−10°. The magnetic head is tilted to make the actual pinned direction parallel to the first direction, concretely opposite to the first direction in this embodiment. Then gradually apply a second magnetic field in the first direction from 0 Oe to 15 kOe, 15 kOe to 0 Oe, 0 Oe to −15 kOe, −15 kOe to 0 Oe respectively, and detect the response curve of the magnetic head with four curve portions as shown in FIG. 10. The maximum output amplitude Max1 under the positive magnetic field is detected, and the maximum output amplitude Max2 under the negative magnetic field is detected, and the magnetization direction tilt ratio is calculated by the below equation:

$$T = \frac{\text{Max1} - \text{Max2}}{\text{Max1} + \text{Max2}};$$

Thus in the present embodiment, $$T = \frac{37 - 14}{37 + 14} = 0.45,$$

accordingly, the magnetization direction tilt angle A1' that the actual magnetization direction 356' tilts towards the actual pinned direction 354' is calculated. After the estimation, the magnetization direction tilt angle A1'=64°.

Figure 11:
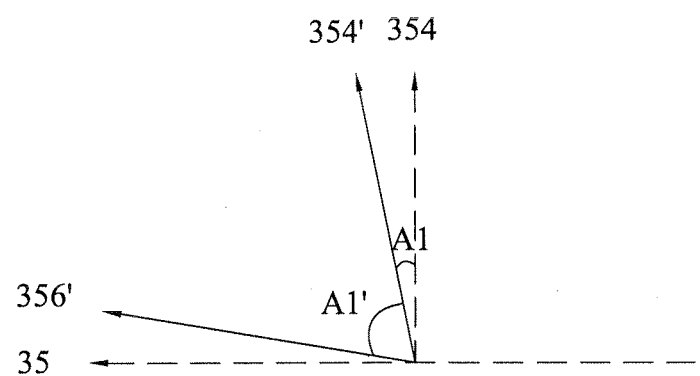
FIG. 11 shows the tilting status of the actual pinned direction and the actual magnetization direction according to the first embodiment.

In conclusion, the actual pinned direction tilt angle A1 and the actual magnetization direction tilt angle A1' in this embodiment is illustrated in FIG. 11.

Figure 12A:
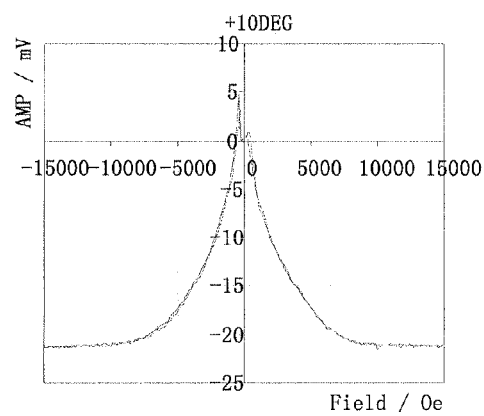
FIGS. 12a-12h show a part of measuring graphs for a second magnetic head sample according to a second embodiment.
Figure 12C:
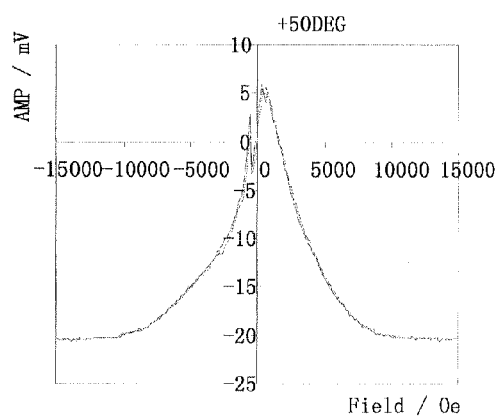
Figure 12B:
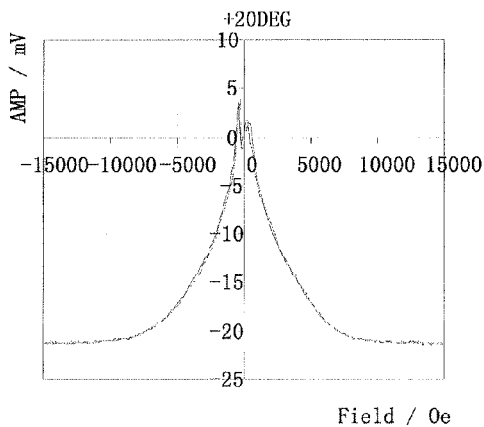
Figure 12D:
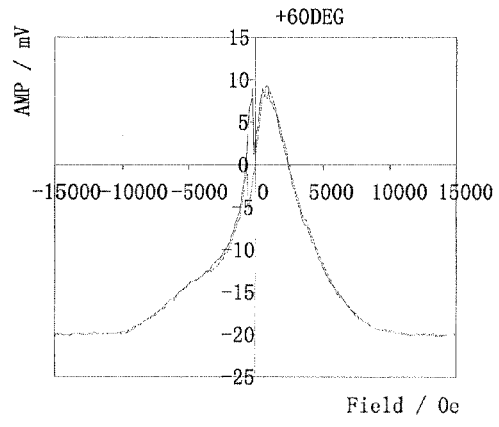
Figure 12E:
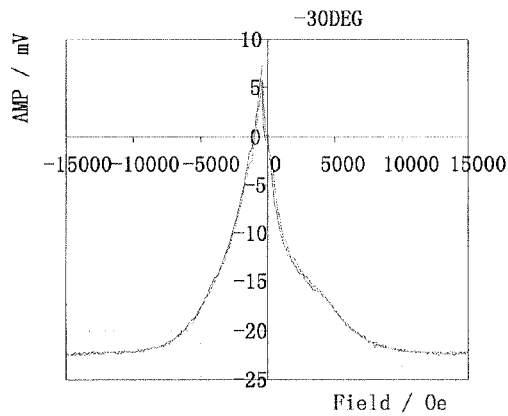
Figure 12G:
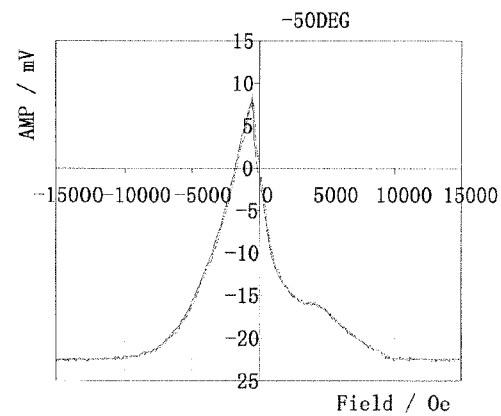
Figure 12F:
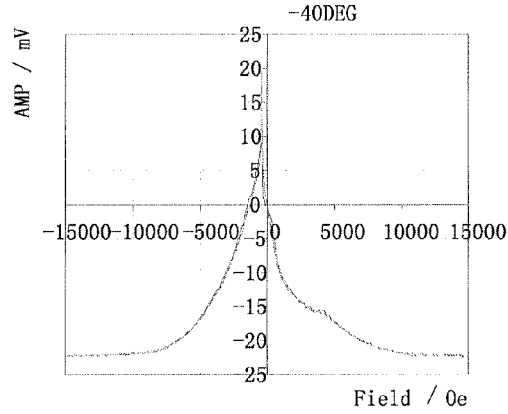
Figure 12H:
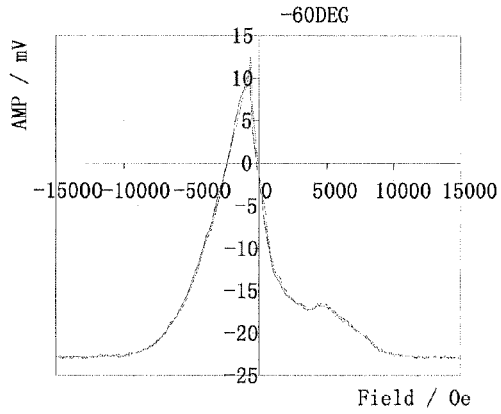
Figure 12I:
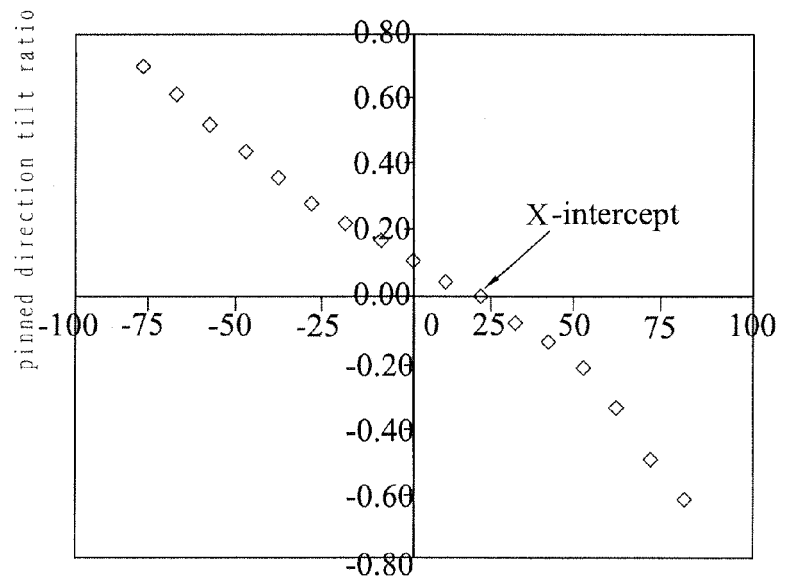
FIG. 12i is a graph that all the pined direction tilt ratios are plotted thereon according to the second embodiment.
Figure 12J:
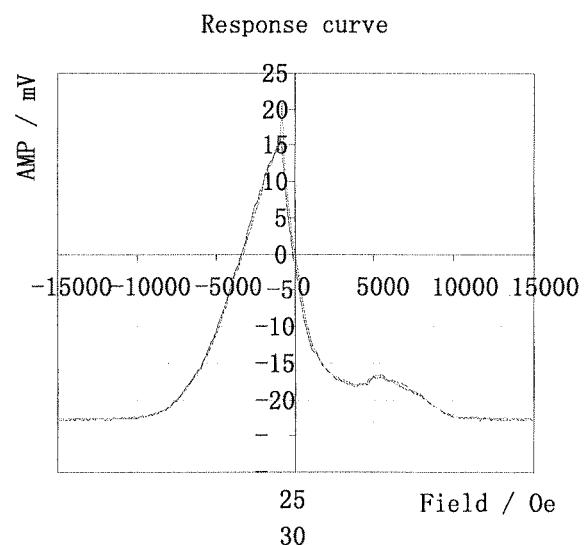
FIG. 12j shows a response curve of the magnetic head that the pinned direction is tilted parallel to the first direction according to the second embodiment.
Figure 12K:
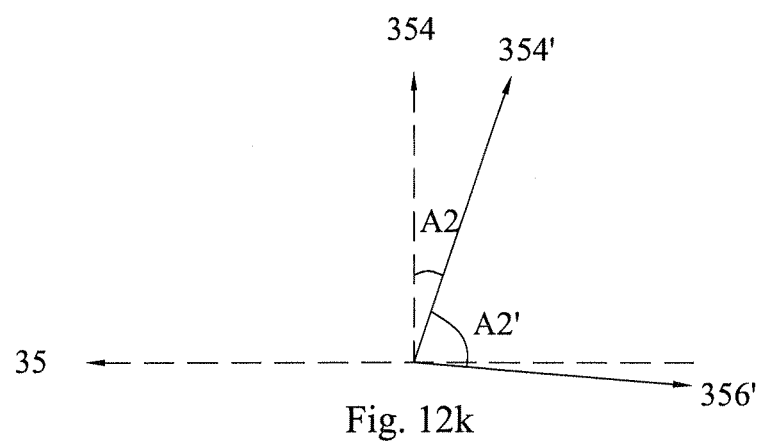
FIG. 12k shows the tilting status of the actual pinned direction and the actual magnetization direction according to the second embodiment.

FIGS. 12a-12h show a part of measuring graphs of for a second magnetic head sample according to a second embodiment, only several typical measuring graph are shown. The measuring method is the same to the first embodiment, whose detailed explanations are omitted here. The actual pinned direction tilt angle A2=+20° estimated by curve tracing in FIG. 12i. And the magnetization direction tilt ratio T2'=0.24 calculated according to the response curve shown in FIG. 12j, and the magnetization direction tilt angle A2'=76°. The actual pinned direction tilt angle A2 and the actual magnetization direction tilt angle A2' in this embodiment is illustrated in FIG. 12k.

Figure 13A:
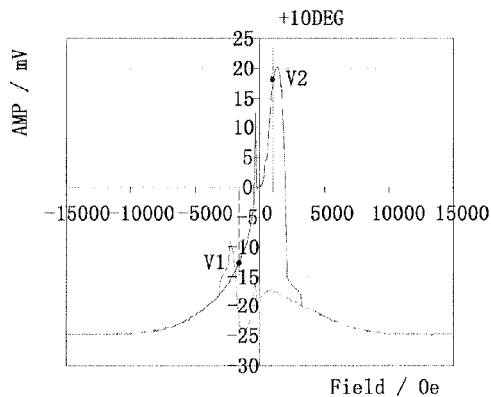
FIGS. 13a-13h show measuring graphs of a third example for a third magnetic head sample.
Figure 13D:
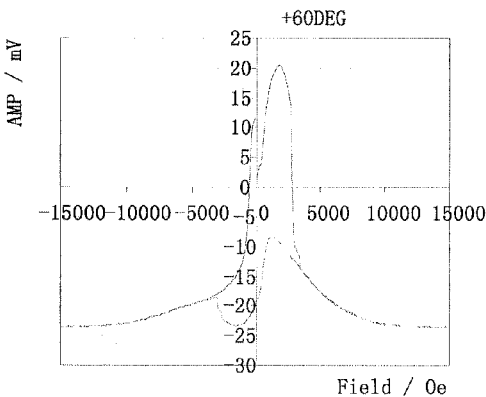
Figure 13B:
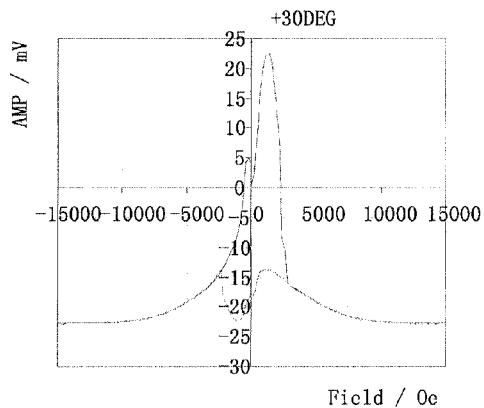
Figure 13E:
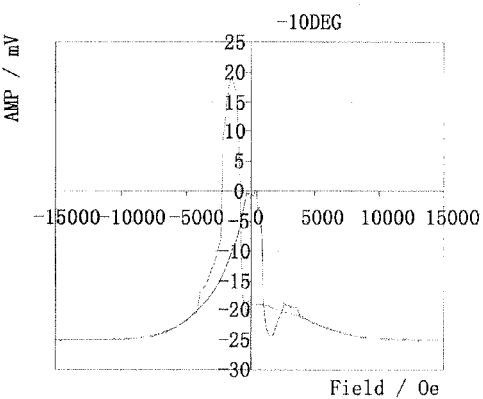
Figure 13C:
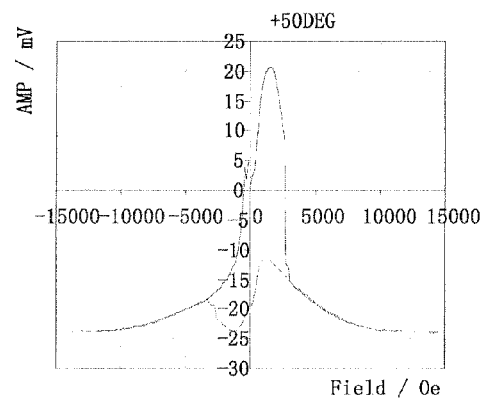
Figure 13F:
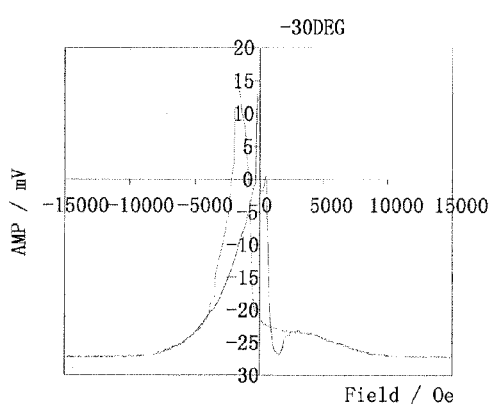
Figure 13G:
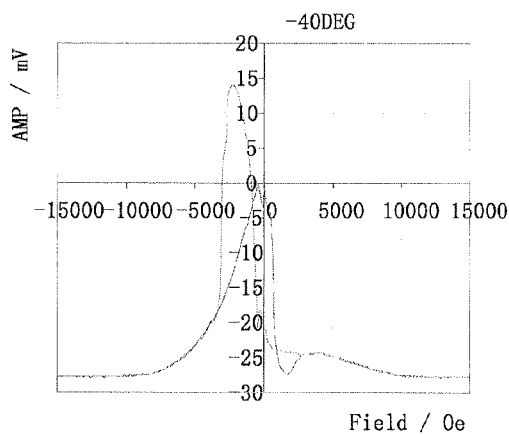
Figure 13H:
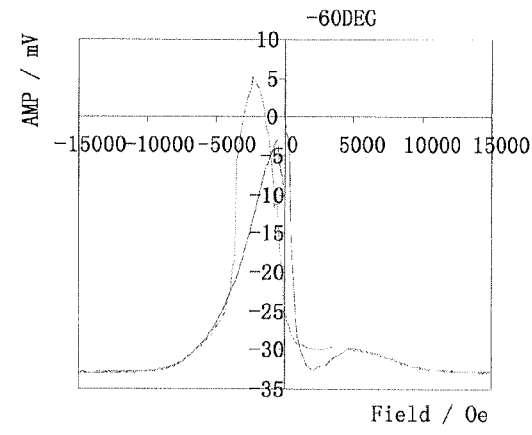
Figure 13I:
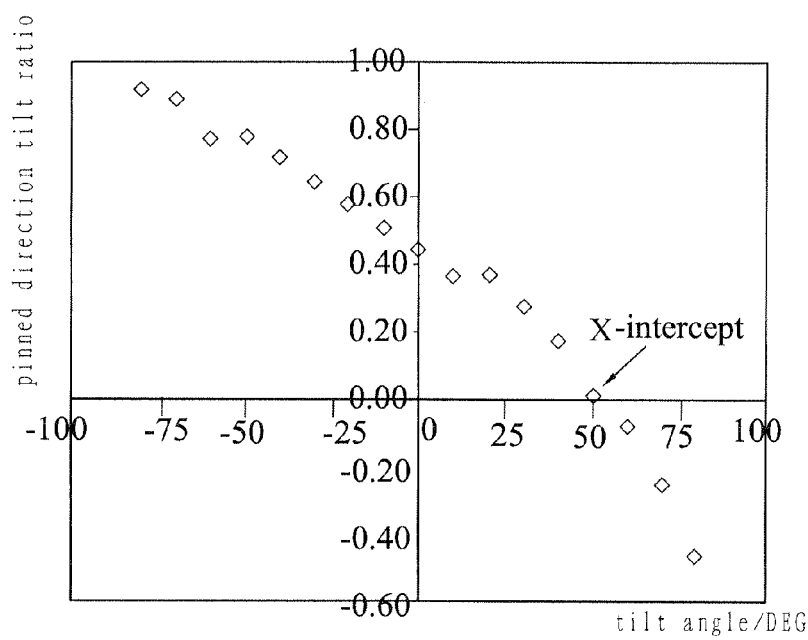
FIG. 13i is a graph that all the pined direction tilt ratios are plotted thereon according to the third example.
Figure 13J:
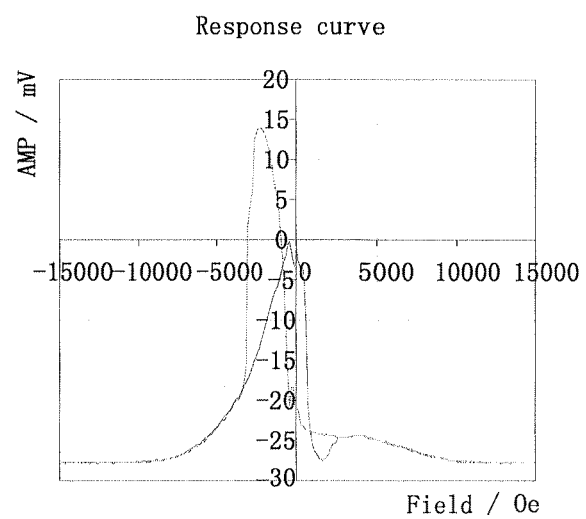
FIG. 13j shows a response curve of the magnetic head that the pinned direction is tilted parallel to the first direction according to the third embodiment.
Figure 13K:
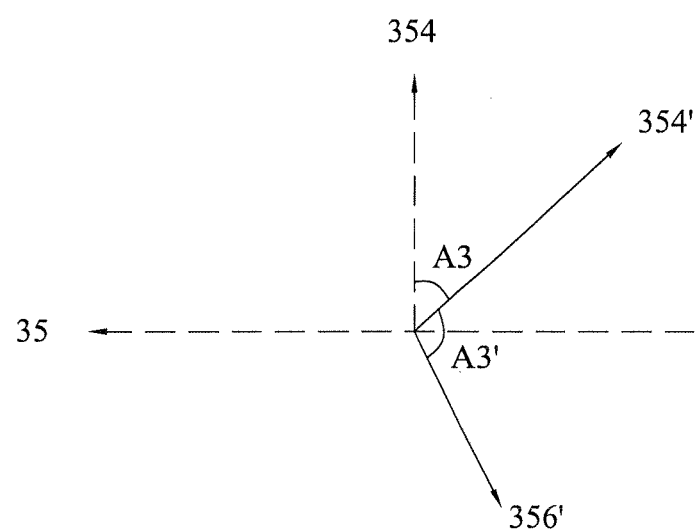
FIG. 13k shows the tilting status of the actual pinned direction and the actual magnetization direction according to the third embodiment.

FIGS. 13a-13h show a part of measuring graphs for a third magnetic head sample according to a third embodiment. The measuring method for the pinned direction tilt angle is similar to the first embodiment, except that the two output amplitudes V1, V2 are detected under the X-axis is −1 kOe and +1 kOe when measuring the pinned direction tilt ratios, as shown in FIG. 13a for example. FIG. 13i shows all pinned direction tilt ratios measured for eighteen times, and the actual pinned direction tilt angle A3 of the present magnetic head is equal to +50°. And the magnetization direction tilt angle T3'=−0.33 according to the response curve in FIG. 13j, thus the magnetization direction tilt angle A3'=110°. Therefore, the actual pinned direction tilt angle A3 and the actual magnetization direction tilt angle A3' in this embodiment is illustrated in FIG. 13k.

A plurality of magnetic head samples is tested by the present measuring method, only three representative examples are shown in the above embodiments.

In comparison with the prior art, the present invention can measure out the pinned direction tilt angle of the pinned layer that the actual pinned direction tilts towards the second direction (the normal pinned direction), and measure out the magnetization direction tilt angle of the free layer that the actual magnetization direction tilts towards the actual pinned direction. Thus the manufacturers can understand the performance of the magnetic head according to the tilt angles, and try to improve the bad performance before the product into the market. Therefore the measuring method of the present invention is quite desired by the manufacturers.

Figure 14:
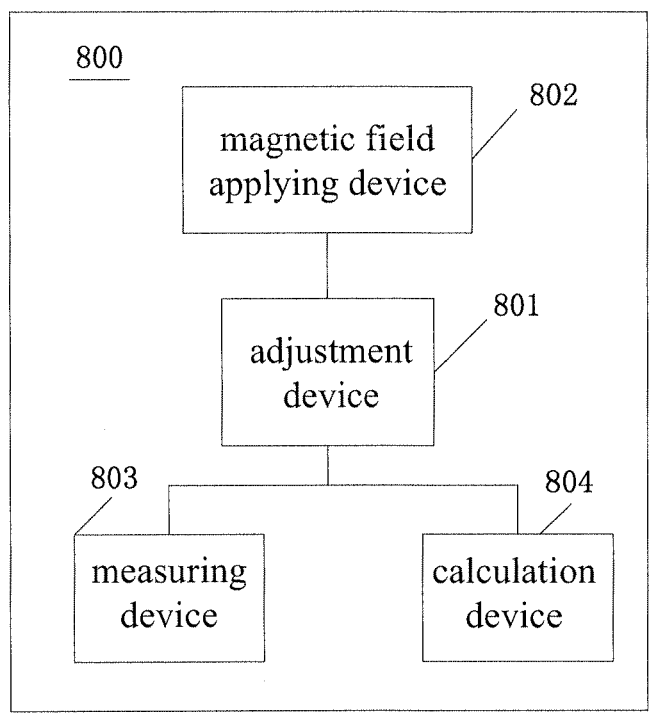
FIG. 14 is a structure diagram of a measuring apparatus of a magnetic head according to one embodiment of the present invention.

Accordingly, the present invention also provides a measuring apparatus 800 of a magnetic head, as shown in FIG. 14. The measuring apparatus 800 is adapted for performing the measuring method described above, which includes an adjustment device 801 for tilting the magnetic head at an angle to a second direction that is perpendicular to an ABS of the magnetic head; a magnetic field applying device 802 for applying a plurality of first magnetic fields with different intensities in a first direction to the magnetic head, and the first direction parallel to the ABS and two shielding layers of the magnetic head; a measuring device 803 for measuring out first output parameter curves with the first magnetic fields applying; and an calculation device 804 for calculating pinned direction tilt ratios that a pinned direction of a pinned layer of the magnetic head tilts towards the second direction according to the first output parameter curves, and calculating a pinned direction tilt angle that the pinned direction tilts towards the second direction according to the pinned direction tilting ratios.

Preferably, the adjustment device 801 is further arranged for tilting the magnetic head to make the pinned directing parallel to the first direction, the magnetic field applying device 802 is further arranged for applying a plurality of second magnetic fields with different intensities in the first direction to the magnetic head, the measuring device 803 is further arranged for measuring out second output parameter curves with the second magnetic fields applying, and the calculation device 804 is further arranged for calculating a magnetization direction tilt ratio of a magnetization direction of the free layer of the magnetic head titling towards the pinned direction.

It's easy to understand that the measuring apparatus 800 performs the corresponding process mentioned above and can obtain all advantages described in the embodiments of the measuring method.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A measuring method of a magnetic head, comprising steps of:
   (a) placing the magnetic head at normal position, defining a first direction parallel to an air bearing surface and two shielding layers of the magnetic head, and defining a second direction perpendicular to air bearing surface;
   (b) tilting the magnetic head at an angle to the second direction, applying a plurality of first magnetic fields with different intensities in the first direction to the magnetic head, and measuring out a first output parameter curve;
   (c) repeating the step (b) with different angles and measuring out a plurality of first output parameter curves;
   (d) calculating a plurality of pinned direction tilt ratios that a pinned direction of a pinned layer of the magnetic head tilts towards the second direction according to the first output parameter curves; and
   (e) calculating a pinned direction tilt angle that the pinned direction tilts towards the second direction according to the pinned direction tilting ratios.

2. The measuring method according to claim 1, wherein the step (b) further comprises sub-steps of:
   (b1) gradually applying the first magnetic field from 0 Oe to +15 kOe, thereby obtaining a first curve portion of the first output parameter curve;
   (b2) gradually applying the first magnetic field from +15 kOe to 0 Oe, thereby obtaining a second curve portion of the first output parameter curve;

(b3) gradually applying the first magnetic field from 0 Oe to −15 kOe, thereby obtaining a third curve portion of the first output parameter curve; and (b4) gradually applying the first magnetic field from −15 kOe to 0 Oe, thereby obtaining a fourth curve portion of the first output parameter curve.

3. The measuring method according to claim 2, wherein the step (d) further comprises detecting a pair of output amplitudes at symmetrical coordinates on the first output parameter curve, and detecting a minimal output amplitude on the first output parameter curve so as to calculate the pinned direction tilting ratio.

4. The measuring method according to claim 3, wherein the step (d) further comprises detecting the pair of output amplitudes on the second curve portion and the fourth curve portion of the first output parameter curve at symmetrical coordinates.

5. The measuring method according to claim 3, wherein the step (d) further comprises detecting the pair of output amplitudes on the first output parameter curve under the first magnetic field with intensities of −1.5 kOe and +1.5 kOe respectively.

6. The measuring method according to claim 3, wherein the step (d) further comprises detecting the pair of output amplitudes on the first output parameter curve under the first magnetic field with intensities of −1 kOe and +1 kOe respectively.

7. The measuring method according to claim 1, wherein the step (e) further comprises calculating the pinned direction tilting angle by curve tracing.

8. The measuring method according to claim 1, wherein the angle in the steps (b) and (c) has a range of −80°~+90°.

9. The measuring method according to claim 1, wherein after the step (e), the method further comprises steps of:

(f) titling the magnetic head to make the pinned direction parallel to the first direction, applying a plurality of second magnetic fields with different intensities in the first direction to the magnetic head, and measuring out a second output parameter curve;

(g) detecting several maximum output amplitudes on the second output parameter curve so as to calculate a magnetization direction tilt ratio of a magnetization direction of a free layer of the magnetic head titling towards the pinned direction; and (h) calculating a magnetization direction tilt angle that the magnetization direction tilts towards the pinned direction according to the magnetization direction tilt ratio.

10. The measuring method according to claim 9, wherein the step (f) further comprises titling the magnetic head to make the pinned direction same to the first direction.

11. The measuring method according to claim 9, wherein the step (f) further comprises titling the magnetic head to make the pinned direction opposite to the first direction.

12. The measuring method according to claim 9, wherein the step (f) further comprises sub-steps of:

(f1) gradually applying the second magnetic field from 0 Oe to +15 kOe, thereby obtaining a first curve portion of the second output parameter curve;

(f2) gradually applying the second magnetic field from +15 kOe to 0 Oe, thereby obtaining a second curve portion of the second output parameter curve;

(f3) gradually applying the second magnetic field from 0 Oe to −15 kOe, thereby obtaining a third curve portion of the second output parameter curve; and (f4) gradually applying the second magnetic field from −15 kOe to 0 Oe, thereby obtaining a fourth curve portion of the second output parameter curve.

13. The measuring method according to claim 12, wherein the step (g) further comprising detecting a first maximum output amplitude on the first and second curve portions of the second output parameter curve, and detecting a second maximum output amplitude on the third and fourth curve portions of the second output parameter curve.

14. The measuring method according to claim 9, wherein the intensities of the first and second magnetic fields have a range of −15 kOe~+15 kOe.

15. The measuring method according to claim 9, wherein the output parameter of the first and the second output parameter curves is output resistance or output voltage.

16. A measuring apparatus of a magnetic head, comprising:
an adjustment device for tilting the magnetic head at an angle to a second direction that is perpendicular to an air bearing surface of the magnetic head;
a magnetic field applying device for applying a plurality of first magnetic fields with different intensities in a first direction to the magnetic head, and the first direction parallel to the air bearing surface and two shielding layers of the magnetic head;
a measuring device for measuring out first output parameter curves with the first magnetic fields applying; and
an calculation device for calculating pinned direction tilt ratios that a pinned direction of a pinned layer of the magnetic head tilts towards the second direction according to the first output parameter curves, and calculating a pinned direction tilt angle that the pinned direction tilts towards the second direction according to the pinned direction tilting ratios.

17. The measuring apparatus according to claim 16, wherein the calculation device is further arranged for detecting a pair of output amplitudes at symmetrical coordinates, and a minimal output amplitude on the first output parameter curve so as to calculate the pinned direction tilting ratio.

18. The measuring apparatus according to claim 16, wherein the adjustment device is further arranged for tilting the magnetic head to make the pinned directing parallel to the first direction.

19. The measuring apparatus according to claim 18, wherein the magnetic field applying device is further arranged for applying a plurality of second magnetic fields with different intensities in the first direction to the magnetic head.

20. The measuring apparatus according to claim 19, wherein the measuring device is further arranged for measuring out a second output parameter curve with the second magnetic fields applying.

21. The measuring apparatus according to claim 20, wherein the calculation device is further arranged for calculating a magnetization direction tilt ratio of a magnetization direction of a free layer of the magnetic head titling towards the pinned direction according to the second output parameter curve.

22. The measuring apparatus according to claim 21, wherein the calculation device is further arranged for detecting several maximum amplitudes on the second output parameter curve so as to calculate the magnetization direction tilt ratio.

23. The measuring apparatus according to claim 22, wherein the calculation device is further arranged for calculating a magnetization direction tilt angle that the magnetization direction tilts towards the pinned direction according to the magnetization direction tilt ratio.

24. The measuring apparatus according to claim 19, wherein the intensities of the first and second magnetic fields have a range of −15 kOe~+15 kOe.

25. The measuring apparatus according to claim 16, wherein the adjustment device is arranged for tilting the magnetic head at an angle with a range of −80°~+90° to the second direction.

* * * * *